US011710973B2

United States Patent
Kersey et al.

(10) Patent No.: US 11,710,973 B2
(45) Date of Patent: Jul. 25, 2023

(54) FAST CHARGER AND FAST CHARGER PROCESS

(71) Applicant: MarathonNorco Aerospace, Inc., Waco, TX (US)

(72) Inventors: Philip Kersey, Waco, TX (US); Jason VanDeVelde, Waco, TX (US)

(73) Assignee: MarathonNorco Aerospace, Inc., Waco, TX (US)

(*) Notice: Subject to any disclaimer, the term of this patent is extended or adjusted under 35 U.S.C. 154(b) by 61 days.

(21) Appl. No.: 16/411,215

(22) Filed: May 14, 2019

(65) Prior Publication Data

US 2019/0348845 A1 Nov. 14, 2019

Related U.S. Application Data

(60) Provisional application No. 62/670,975, filed on May 14, 2018.

(51) Int. Cl.
| | |
|---|---|
| *H01M 10/46* | (2006.01) |
| *H02J 7/00* | (2006.01) |
| *H01M 10/44* | (2006.01) |
| *H01M 50/269* | (2021.01) |
| *H01M 50/204* | (2021.01) |

(52) U.S. Cl.
CPC ......... *H02J 7/0024* (2013.01); *H01M 10/441* (2013.01); *H01M 50/204* (2021.01); *H01M 50/269* (2021.01); *H01M 2220/20* (2013.01); *H02J 2310/44* (2020.01)

(58) Field of Classification Search
CPC .. H02J 7/0024; H02J 7/007; H02J 7/00; H02J 7/143; H02J 2310/44; H01M 10/44; H01M 2/10; H01M 2/1016; H01M 2/441; H01M 2220/20; H01M 10/46; H01M 10/441; H01M 50/204; H01M 50/269
USPC ................. 320/112, 125, 116, 120, 132, 134
See application file for complete search history.

(56) References Cited

U.S. PATENT DOCUMENTS

| | | |
|---|---|---|
| 3,320,441 A | 5/1967 | Pehoushek |
| 5,898,291 A | 4/1999 | Hall |
| 6,049,190 A | 4/2000 | Canter et al. |
| | (Continued) | |

OTHER PUBLICATIONS

International Preliminary Report on Patentability and Written Opinion issued in PCT/US2019/032247, dated Nov. 26, 2020.

(Continued)

*Primary Examiner* — Edward Tso
(74) *Attorney, Agent, or Firm* — BakerHostetler

(57) ABSTRACT

A battery charger system includes a first circuit configured to connect to a power bus and a second set of battery cells, and a second circuit configured to connect to the power bus and a first set of battery cells. The first circuit including a first switch to electrically connect or disconnect the first circuit to the power bus and the second set of battery cells. The second circuit includes a second switch to electrically connect or disconnect the second circuit to the power bus and the first set of battery cells. The system includes a third circuit configured to connect the first set of battery cells to the second set of battery cells. The third circuit includes a third switch to electrically connect or disconnect the first set of battery cells to the second set of battery cells. A battery charger process and an aircraft-based power system is disclosed as well.

24 Claims, 8 Drawing Sheets

(56) References Cited

U.S. PATENT DOCUMENTS

| | | | | |
|---|---|---|---|---|
| 6,957,048 | B2 | 10/2005 | Formenti | |
| 8,269,641 | B2* | 9/2012 | Bauman | H02J 7/14 |
| | | | | 320/132 |
| 9,287,768 | B2 | 3/2016 | Guyomard et al. | |
| 2008/0036419 | A1* | 2/2008 | Cook | H02J 7/0031 |
| | | | | 320/103 |
| 2008/0211309 | A1 | 9/2008 | Nolte | |
| 2011/0248680 | A1* | 10/2011 | Timmons | H01M 50/296 |
| | | | | 320/120 |
| 2012/0074894 | A1* | 3/2012 | Chen | H02J 7/00 |
| | | | | 320/103 |
| 2013/0119947 | A1* | 5/2013 | Ishida | B60L 53/63 |
| | | | | 320/162 |
| 2014/0009106 | A1* | 1/2014 | Andrea | H02J 7/0018 |
| | | | | 320/107 |
| 2014/0361730 | A1* | 12/2014 | Kung | H02M 3/1584 |
| | | | | 320/107 |
| 2015/0207343 | A1* | 7/2015 | Zhai | H02J 7/0032 |
| | | | | 320/112 |
| 2016/0301232 | A1* | 10/2016 | Shiobara | H02J 13/0075 |
| 2017/0001511 | A1* | 1/2017 | Kulkarni | B60L 50/10 |
| 2017/0120772 | A1* | 5/2017 | Alser | H02J 7/0048 |
| 2018/0062402 | A1* | 3/2018 | Syouda | H02J 7/0019 |
| 2019/0225109 | A1* | 7/2019 | Ono | B60L 3/0015 |

OTHER PUBLICATIONS

International Search Report and Written Opinion issued in PCT/US19/32247, dated Sep. 16, 2019.

\* cited by examiner

FAST CHARGER AND FAST CHARGER PROCESS

CROSS REFERENCE TO PRIOR APPLICATIONS

This application claims the benefit of U.S. Provisional Application No. 62/670,975 filed on May 14, 2018, which is hereby incorporated by reference in its entirety for all purposes as if fully set forth herein.

FIELD OF THE DISCLOSURE

The disclosure relates to a fast charger. The disclosure also relates to a fast charger process. Additionally, the disclosure relates to a divided fast charger. The disclosure also relates to a divided fast charger process. The disclosure further relates to a halved fast charger. More particularly, the disclosure relates to a halved fast charger process.

BACKGROUND OF THE DISCLOSURE

Aircraft and other aerospace applications typically benefit from one or more onboard battery systems to provide power for various components onboard the aircraft. The onboard battery systems can be charged by internal power sources through a battery charging mechanism. However, prior art battery charging mechanisms typically provide only a limited charging capacity and/or capability resulting in a lengthy charge time. This especially comes into play in aircraft operations that involve shorter flight/operational times. The shorter flight/operational times prevent the onboard battery systems from being fully charged by the internal power sources. Moreover, the shorter flight/operational times result in a higher frequency of onboard battery usage (e.g., engine starting). The combination of both result in reduced battery charging, higher battery power usage, and insufficient battery power. This can be detrimental to the operation of the aircraft that results in delays, possible downtime, safety issues, and the like.

Accordingly, a charging system having a decreased charging time is needed.

SUMMARY OF THE DISCLOSURE

The foregoing needs are met, to a great extent, by the disclosure, wherein in one aspect a process and apparatus are provided for decreasing charging time.

In accordance with one aspect, a battery charger system includes a first circuit configured to connect to a power bus and a second set of battery cells; a second circuit configured to connect to the power bus and a first set of battery cells; the first circuit includes a first switch to electrically connect or disconnect the first circuit to the power bus and the second set of battery cells; the second circuit includes a second switch to electrically connect or disconnect the second circuit to the power bus and the first set of battery cells; a third circuit configured to connect the first set of battery cells to the second set of battery cells; and the third circuit includes a third switch to electrically connect or disconnect the first set of battery cells to the second set of battery cells.

In accordance with one aspect a battery charger process includes connecting a first circuit to a power bus and a second set of battery cells; connecting a second circuit to the power bus and a first set of battery cells; configuring the first circuit with a first switch to electrically connect or disconnect the first circuit to the power bus and the second set of battery cells; configuring the second circuit with a second switch to electrically connect or disconnect the second circuit to the power bus and the first set of battery cells; and configuring a third circuit to connect the first set of battery cells to the second set of battery cells; wherein the third circuit includes a third switch to electrically connect or disconnect the first set of battery cells to the second set of battery cells.

In accordance with one aspect an aircraft-based power system includes a charger system that includes a charger controller and a charger circuit; the charger system further configured to connect to an aircraft power bus; the charger system further configured to deliver power from the aircraft power bus to the charger circuit; the charger circuit configured to be controlled by the charger controller; the charger controller configured to control the charger circuit consistent with a charging protocol; and the charger system further configured to charge a battery system including a plurality of battery cells with the charger circuit consistent with the charging protocol.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
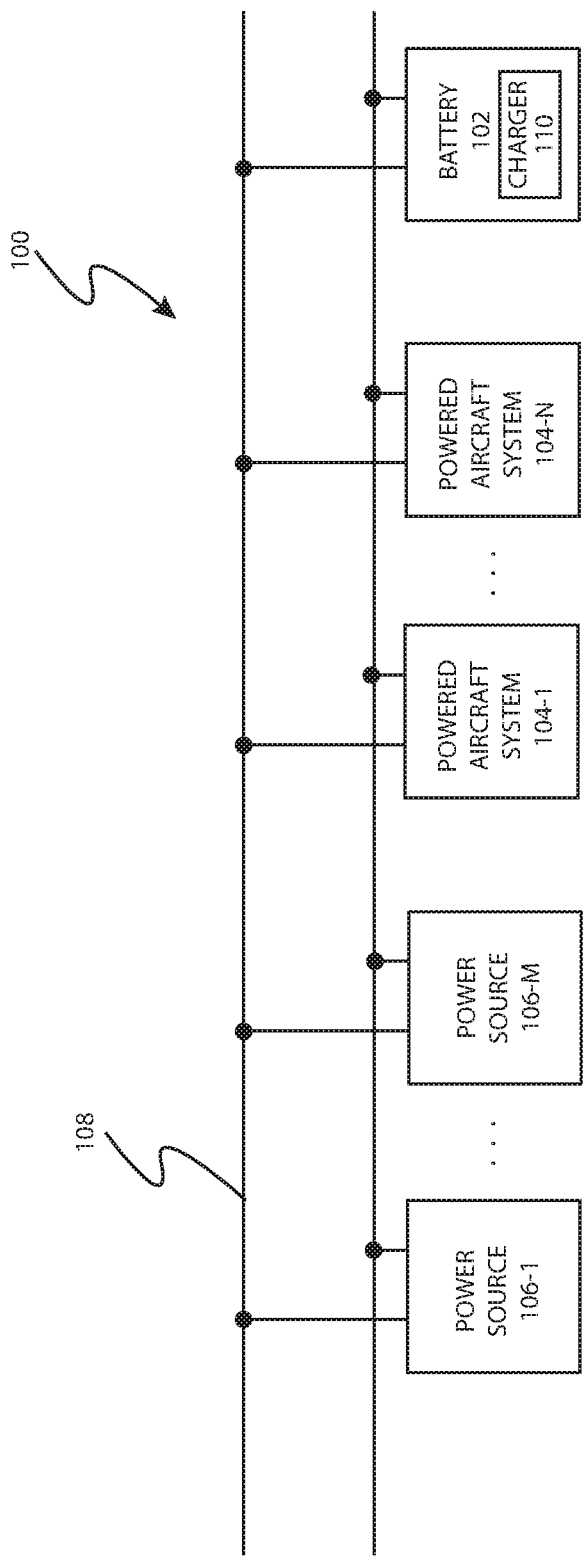
FIG. 1 illustrates an exemplary electrical power system for an aerospace application in accordance with aspects of the disclosure.

The disclosure will now be described with reference to the drawing figures, in which like reference numerals refer to like parts throughout. Aspects of the disclosure advantageously provide a charging system having decreased charging time.

FIG. 1 illustrates an exemplary electrical power system for an aerospace application in accordance with aspects of the disclosure.

In particular, FIG. 1 illustrates an aircraft power system 100. For simplicity and brevity of the disclosure, the exemplary aircraft power system 100 is illustrated with a high level of simplification and generalization. Moreover, although reference is made to an implementation in aircraft or other aerospace applications, the disclosure is equally applicable to implementations in other types of vehicles as well as other battery-powered systems benefiting from accelerated charging of associated battery systems. For brevity of disclosure, reference will be made to aircraft in the disclosure.

The aircraft power system 100 may include an aircraft power bus 108. The aircraft power bus 108 may include at least two power lines providing positive and negative voltage potential. The aircraft power bus 108 may extend along at least a portion of the aircraft internally connecting to various aircraft systems. For example, the aircraft power bus 108 may connect to powered aircraft systems 104-1 through powered aircraft systems 104-N, where N is a positive integer. The powered aircraft systems 104 may include flight control systems, landing gear systems, electrical systems, bleed systems, hydraulic systems, avionics systems, supplemental oxygen systems, fuel systems, power plant systems, navigation systems, communication systems, ice protection systems (anti-icing and deicing), environmental control systems, instrumentation and recording systems, vacuum systems, fire protection systems, safety systems, and the like. Each of the powered aircraft systems 104 may need electrical power for operation of one or more aspects thereof. Accordingly, the powered aircraft systems 104 may connect to the aircraft power bus 108 to receive power. For example, in one aspect the powered aircraft system 104 may include an auxiliary power unit that requires power for starting. As another example, in one aspect the powered aircraft system 104 may include a turbine unit that requires power for starting.

The aircraft power system 100 may further include at least one power source system 106 (power source system 106-1 through power source system 106-M, M being an integer). The power source system 106 may be a generator associated with the auxiliary power unit, a generator associated with the turbine, and the like. When operational, the power source system 106 provides power to the aircraft power bus 108 for operation of the powered aircraft systems 104. Additionally, the powered aircraft systems 104 may provide charging power to a battery system 102. On the other hand, when the power source system 106 is not operational or is providing insufficient power to the aircraft power bus 108, the battery system 102 may provide power to the aircraft power bus 108. In one aspect, the aircraft power bus 108 may be configured for operation at or about 28 V DC and rated for 700 amps. Other voltages and currents are contemplated as well for the aircraft power bus 108.

Additionally according to the disclosure, the battery system 102 may include a charging system 110. As further detailed below, the charging system 110 is configured to provide decreased charging time for the charging of the battery system 102.

Figure 2:
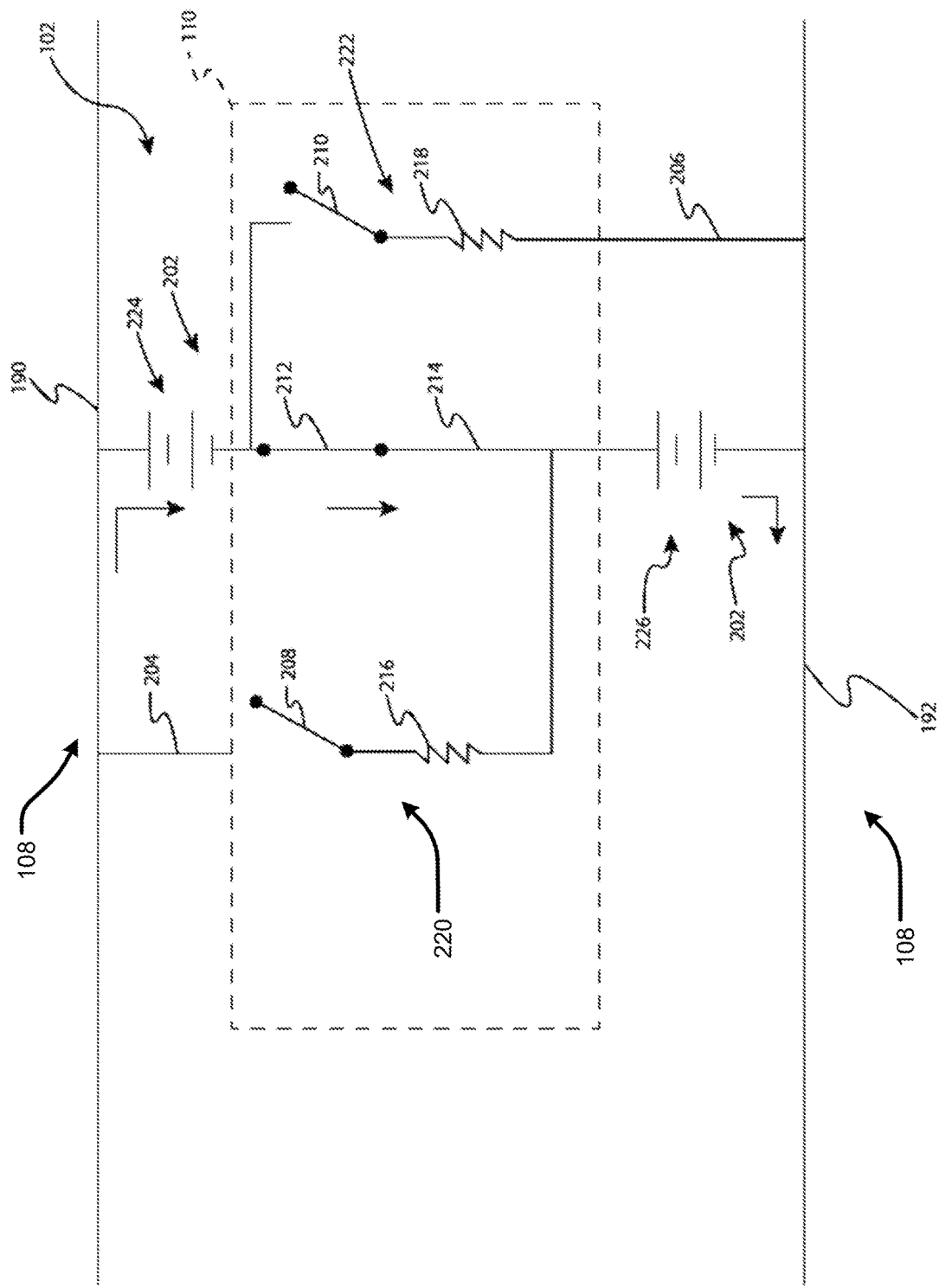
FIG. 2 illustrates a battery system and charger system for an aerospace application in a normal operational configuration in accordance with aspects of the disclosure.

FIG. 2 illustrates a battery system and charger system for an aerospace application in a normal operational configuration in accordance with aspects of the disclosure.

In particular, FIG. 2 illustrates the details of the charging system 110 and the battery system 102. The battery system 102 may utilize any type of battery technology. The battery technology implemented by the battery system 102 may include one or more of an Aluminum-ion battery, Lead-acid battery, Lithium-ion battery, Magnesium-ion battery, Molten salt battery, Nickel-cadmium battery, Nickel metal hydride battery, Nickel-zinc battery, Polymer-based battery, and/or the like.

Additionally, the battery system 102 may include a plurality of battery cells 202 or separate battery structures. One or more of the plurality of battery cells 202 may be connected in series to provide an increased voltage level. In one aspect, there may be 20 battery cells 202. Furthermore, the battery system 102 may include a standardized plug to connect the battery system 102 to the aircraft power bus 108. In other aspects, the battery system 102 may be connected directly to the aircraft power bus 108.

In one aspect, there may be 10 battery cells 202. In one aspect, there may be 12 battery cells 202. In one aspect, there may be 14 battery cells 202. In one aspect, there may be 16 battery cells 202. In one aspect, there may be 18 battery cells 202. In one aspect, there may be 22 battery cells 202. In one aspect, there may be 24 battery cells 202. In one aspect, there may be 26 battery cells 202. In one aspect, there may be any number of battery cells 202.

In one aspect, the battery cells 202 are connected in series such that a first battery of the battery cells 202 is connected to a first line 190 of the aircraft power bus 108 and the last battery of the battery cells 202 is connected to a second line 192 of the aircraft power bus 108. Accordingly, in one aspect the battery cells 202 may receive power from the aircraft power bus 108 for charging; and in another aspect the battery cells 202 may provide power to the aircraft power bus 108 for powering the powered aircraft systems 104.

In one aspect illustrated in FIG. 2, the battery system 102 may include a first set 224 of the battery cells 202 and a second set 226 of the battery cells 202. In one aspect, the first set 224 may include a K number of the battery cells 202; and the second set 226 may include an L number of battery cells 202. K and L being a positive integer. In one aspect, K and L may be an equal number of battery cells 202. In one aspect, K or L may be equal to 10 battery cells 202. In one aspect, K and L may be a different number of battery cells 202.

In one aspect, K or L may be equal to 2 of the battery cells 202. In one aspect, K or L may be equal to 6 of the battery cells 202. In one aspect, K or L may be equal to 7 battery cells 202. In one aspect, K or L may be equal to 8 battery cells 202. In one aspect, K or L may be equal to 9 battery cells 202. In one aspect, K or L may be equal to 10 battery cells 202. In one aspect, K or L may be equal to 11 battery cells 202. In one aspect, K or L may be equal to 12 battery cells 202. In one aspect, K or L may be equal to 13 battery cells 202. In one aspect, K or L may be equal to any positive integer number of battery cells 202.

FIG. 2 further illustrates the charging system 110. In one aspect, the charging system 110 may be integrated into the battery system 102 (see FIGS. 5 and 6). In another aspect, the charging system 110 may be separately implemented with the battery system 102 (see FIG. 7). Moreover, the charging system 110 may include a connection 204 to the first line 190 of the aircraft power bus 108 as well as a connection 206 to the second line 192 of the aircraft power bus 108.

The charging system 110 may include a first circuit 220 that includes the connection 204 to the first line 190 of the aircraft power bus 108. The first circuit 220 may connect to the first line 190 of the aircraft power bus 108 through the connection 204 to receive power from the aircraft power bus 108. The first circuit 220 may further include a switch 208 configured to complete the first circuit 220 when the switch 208 is closed and the switch 208 may be further configured to open to render the first circuit 220 inoperative.

The first circuit 220 may further include a resistor 216 in series. The resistor 216 may be implemented as a 0.25 ohm resistor configured for operation at 800 W. Other resistance values including 0.1 ohms to 0.25 ohms, 0.25 ohms to 0.5 ohms, 0.5 ohms to 0.75 ohms, 0.75 ohms to 1 ohms, and operational wattages including 100 watts-400 watts, 400 watts-600 watts, 600 watts-800 watts, 800 watts-1200 watts are contemplated as well. The first circuit 220 may further connect to the second set 226 of the battery cells 202 as well as the first line 190 of the aircraft power bus 108.

The charging system 110 may include a second circuit 222 that includes a connection 206 to the second line 192 of the aircraft power bus 108. The second circuit 222 may connect to the second line 192 of the aircraft power bus 108 through the connection 206. The second circuit 222 may further include a switch 210 configured to complete the second circuit 222 when the switch 210 is closed and the switch 210 may be further configured to open to render the second circuit 222 inoperative.

The second circuit 222 may further include a resistor 218 in series. The resistor 218 may be implemented as a 0.25 ohm resistor configured for operation at 800 W. Other resistance values including 0.1 ohms to 0.25 ohms, 0.25 ohms to 0.5 ohms, 0.5 ohms to 0.75 ohms, 0.75 ohms to 1 ohms, and operational wattages including 100 watts-400 watts, 400 watts-600 watts, 600 watts-800 watts, 800 watts-1200 watts are contemplated as well. The second circuit 222 may further connect to the first set 224 of the battery cells 202 as well as the second line 192 of the aircraft power bus 108.

As further illustrated in FIG. 2, the charging system 110 may include a third circuit 214. The third circuit 214 may connect the first set 224 of battery cells 202 to the second set 226 of battery cells 202. The third circuit 214 may further include a switch 212. In one aspect, when the switch 212 is open the first set 224 of battery cells 202 may be disconnected from the second set 226 of battery cells 202. In one aspect, when the switch 212 is closed the first set 224 of battery cells 202 may be connected in series to the second set 226 of the battery cells 202.

FIG. 2 further illustrates the configuration of the charging system 110 in the normal operational configuration. In this regard, a normal operational configuration is a configuration where the battery system 102 is connected to the aircraft power bus 108 to provide power to the powered aircraft systems 104. The normal operational configuration is also a configuration where the aircraft power bus 108 can provide charging power to the battery system 102. Additionally, the normal operational configuration is the configuration where the battery system 102 is configured such that all of the battery cells 202 are connected in series between the first line 190 of the aircraft power bus 108 and the second line 192 of the aircraft power bus 108. Moreover, the normal operational configuration is the configuration where the switch 212 is closed, the switch 210 is open, and the switch 208 is open. For example, as shown in FIG. 2, the arrows illustrate power moving across the first line 190 of the aircraft power bus 108 into the first set 224 of battery cells 202, through the third circuit 214, through the second set 226 of battery cells 202, and to the second line 192 of the aircraft power bus 108.

Figure 3:
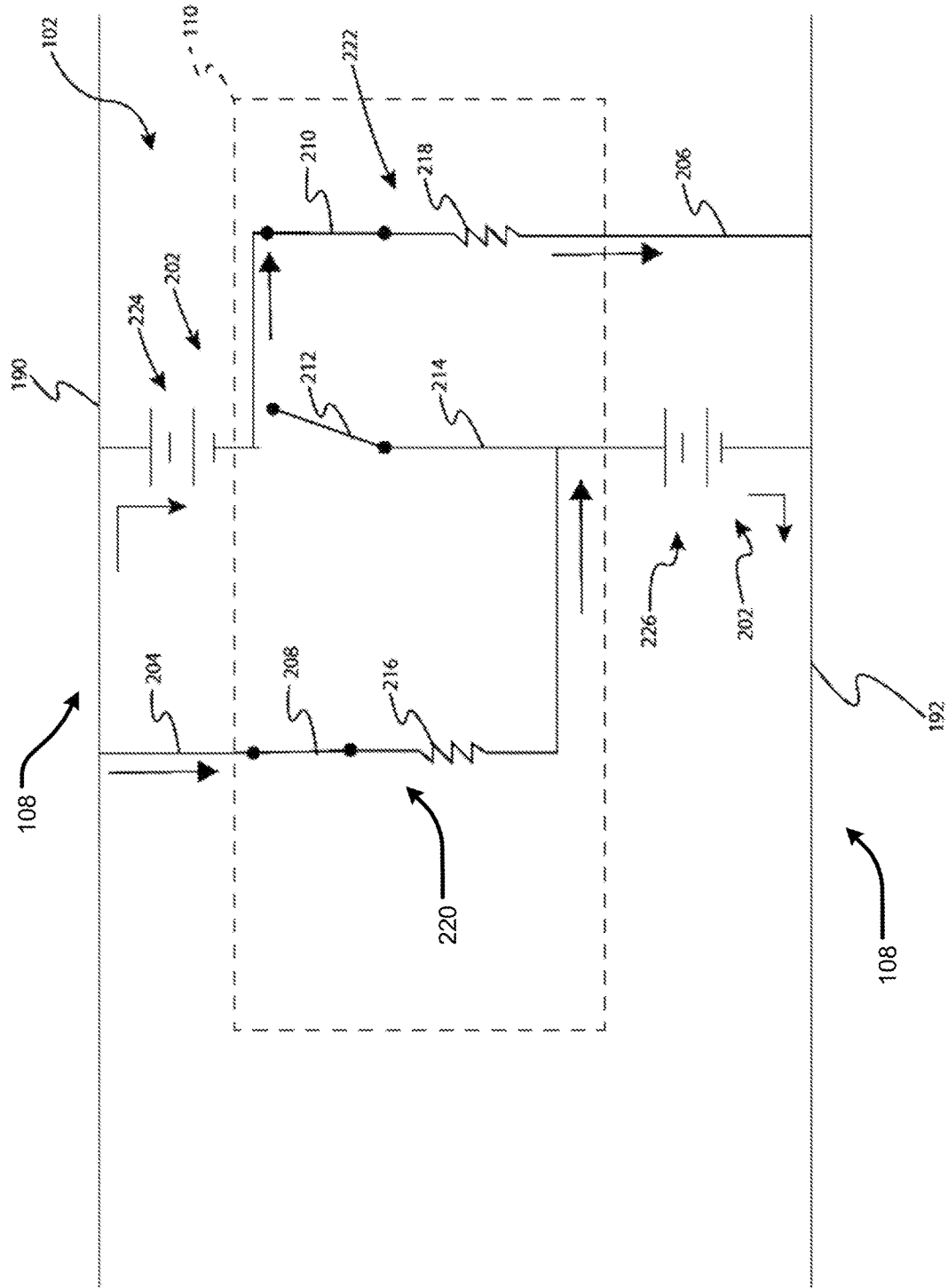
FIG. 3 illustrates a battery system and charger system for an aerospace application in a fast charging operational configuration in accordance with aspects of the disclosure.

FIG. 3 illustrates a battery system and charger system for an aerospace application in a fast charging operational configuration in accordance with aspects of the disclosure.

In particular, FIG. 3 illustrates the fast charging operational configuration. In various aspects of the disclosure, "fast" or "fast charging" is meant to define a time for charging an associated battery that is less than a typical charging time. In various aspects of the disclosure, "fast" or "fast charging" is meant to define a time for charging an associated battery that is less than a charging time when implementing the normal operational configuration. The fast charging operational configuration as illustrated in FIG. 3 illustrates that the switch 212 has been opened, the switch 208 of the first circuit 220 is closed, and the switch 210 of the second circuit 222 is closed. In the fast charging operational configuration, the first circuit 220, the second circuit 222, and the third circuit 214 are configured such that the first set 224 of battery cells 202 directly receive power from the aircraft power bus 108. Moreover, in the fast charging operational configuration, the first circuit 220, the second circuit 222, and the third circuit 214 are configured such that the second set 226 of battery cells 202 directly receive power from the aircraft power bus 108. Accordingly, the first set 224 of battery cells 202 receive a larger voltage (double) with respect to the normal operational configuration; and likewise the second set 226 of battery cells 202 receive a larger voltage (double) with respect to the normal operational configuration. This larger voltage provides an accelerated or faster charging of the battery cells 202 and thus reduces the charging time. Accordingly, the charging system 110 divides the battery cells 202 to increase the voltage across each battery cell 202. As illustrated in FIGS. 2 and 3, the dividing is a dividing by one half. It is further contemplated, that the implementations illustrated in FIGS. 2 and 3 may include additional circuits to divide the battery cells 202 into more than two sets. In one aspect, the charging system 110 may divide the battery cells 202 into 3 sets, 4 sets, 5 sets, or 6 sets.

The switch 208, the switch 212, and the switch 210 may be implemented using any known switching technology. In one aspect, each of the switches may be a relay. In one aspect, the relay may include a coil of wire wrapped around a soft iron core (a solenoid), an iron yoke, which provides a low reluctance path for magnetic flux, a movable iron armature, and one or more sets of contacts. Other configurations of the relay are contemplated as well. The relay may be implemented as a coaxial relay, contactor, force guided contacts relay, latching relay, machine tool relay, or the like. In one aspect, the switches may be solid-state relays. The solid-state relays may use power semiconductor devices such as thyristors, transistors, or the like to switch currents. In one aspect, the switches may be a power module. The transistors may include any type of transistor technology including a Bipolar junction transistor (BJT), a Field-effect transistor (FET), a junction gate field-effect transistor (JFET), a metal-oxide-semiconductor field-effect transistor (MOSFET), or the like.

The switch 208, the switch 212, and the switch 210 may be controlled manually, automatically, or the like. In one aspect, the control of the switch 208, the switch 212, and the switch 210 may be in response to an aircraft system. The aircraft system may be a central maintenance system (CMS), a flight management system (FMS), a flight warning system (FWS), a cabin management system, or the like. The aircraft system may be configured to ascertain a need for operating the charging system 110 in the normal operational mode or the fast charging operational mode and control the charging system 110 and/or the switch 208, the switch 212, and the switch 210 to operate in the desired mode.

In one aspect, the control of the switch 208, the switch 212, and the switch 210 may be in response to a processor. The processor may be configured to ascertain a need for operating the charging system 110 in the normal operational mode or the fast charging operational mode and control the charging system 110 and/or the switch 208, the switch 212, and the switch 210 to operate in the desired mode. The processor may be implemented in the charging system 110, the processor may be implemented in the aircraft, an aircraft system, or the like.

The processor may be implemented as a computer system that may include a memory, a display, a transceiver, a user interface, and the like. The processor may be configured to process functions, provide other services, and the like. The computer system may further include a user interface, an input/output device, a computer readable medium, and a power supply. Additionally, the computer system may implement an operating system, a touchscreen controller, a communications component, a graphics component, a contact/motion component, and the like to provide full functionality. In particular, the processor may be configured to execute a software application configured to control the charging system 110 to charge the battery system 102 in the desired mode. In one aspect, the software application may be configured to interact with sensors, aircraft systems, and the like for a determination of the operational mode. In one aspect, the software application may implement the process 400 described below.

The processor may further include one or more sensors to sense a condition of the battery system 102, the charging system 110, an aircraft system, a power source system 106, a powered aircraft system 104, or the like. In particular, the one or more sensors may provide signals to the processor in order to change the operational mode. The one or more sensors may include a current sensor, a voltage sensor, and the like.

In a further alternative aspect, the charging system 110 may include a plurality switches across the battery cells 202 of the battery system 102. In particular, each of the plurality switches may be structured and arranged to short a number of the battery cells 202 effectively lowering the cell count and battery voltage and increasing the charge current through the battery system 102. This aspect requires no increase (boost) of bus voltage or isolation from the aircraft power bus 108. In further aspects, a rotation or cycling of the switches would ensure that the battery system 102 charges evenly. In various aspects, the method would give greater control over charge current and should not negatively impact the quality of the aircraft power bus 108 voltage because the battery cells will effectively filter switching transients.

In a particular aspect, the switches may be FET (Field-effect transistor) switches and may include an active cycling of the FET switches across the cells. In one aspect, there may be 4 FETs that would short 5 of the battery cells 202 effectively lowering the cell count and battery voltage by 25% and increase the charge current through the battery system 102. In other aspects, any number of FETs may short any number of battery cells 202.

The charging system 110 and/or the processor may include Built-in test equipment (BITE). The Built-in test equipment (BITE) may be configured to address fault management and include diagnostic equipment built into the charging system 110 to support maintenance processes. The Built-in test equipment (BITE) may include sensors, multimeters, oscilloscopes, discharge probes, frequency generators, and the like to enable testing and perform diagnostics. The Built-in test equipment (BITE) may include the detection of the fault, the accommodation of the fault (how the system actively responds to the fault), the annunciation or logging of the fault to warn of possible effects and/or aid in troubleshooting the faulty equipment, or the like.

Figure 4:
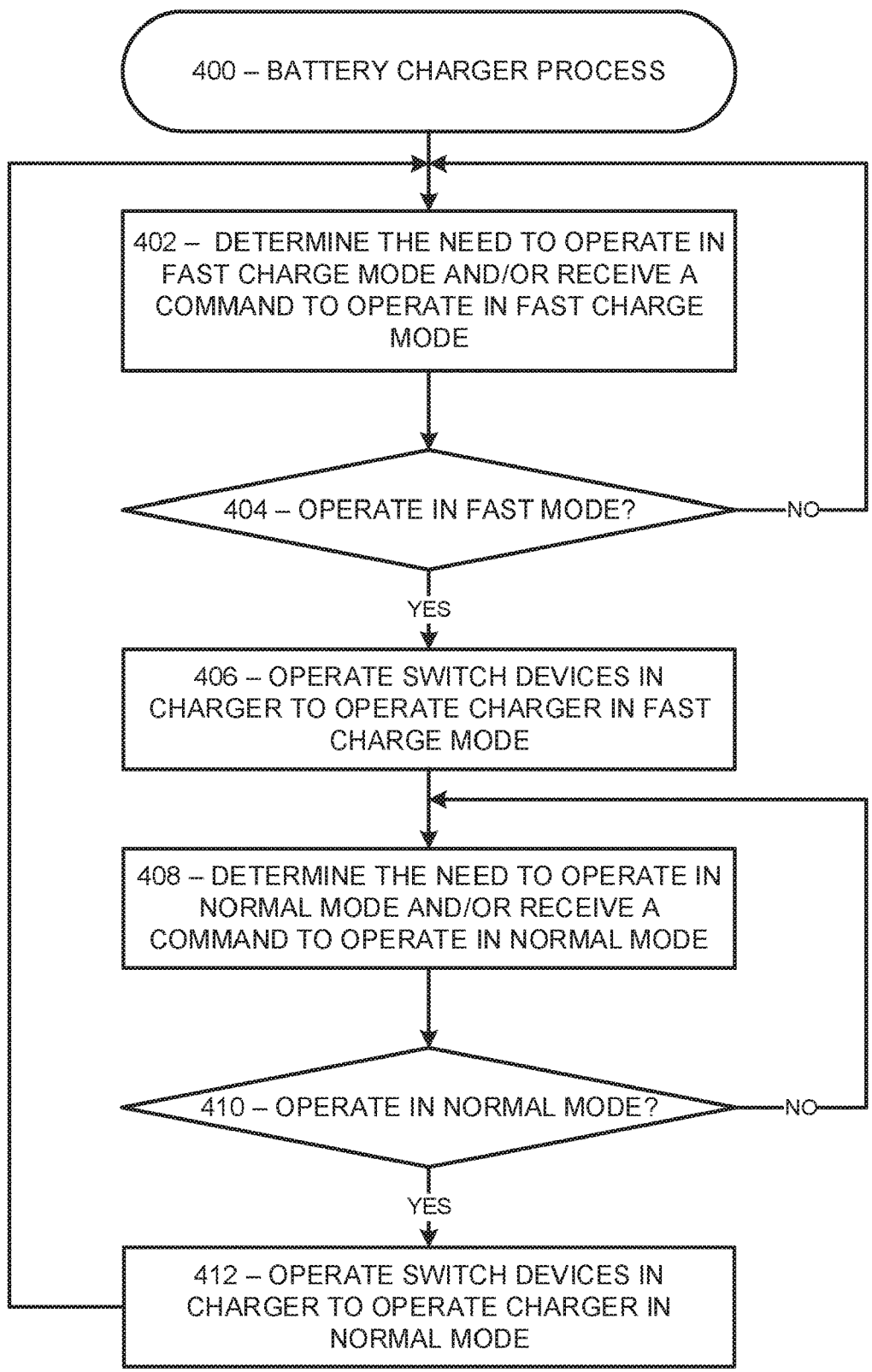
FIG. 4 illustrates a process of operating a battery system and charger system for an aerospace application in accordance with aspects of the disclosure.

FIG. 4 illustrates a process of operating a battery system and charger system for an aerospace application in accordance with aspects of the disclosure.

In particular, FIG. 4 illustrates a battery charger process 400. The battery charger process 400 may be implemented by the processor, the charging system 110, the battery system 102, the aircraft, the aircraft system, or the like.

In box 402, the process 400 may determine the need to operate in the fast charging operational mode and/or receive a command to operate in the fast charging operational mode. The determination may be from the processor, the one or more sensors associated with the processor, the charging system 110, the battery system 102, the aircraft, the aircraft system, or the like.

In box 404, the process 400 may determine to operate in the fast charging operational mode. Thereafter, the process will advance to box 406. Otherwise, the process 400 may loop until a determination is made to operate in the fast charging operational mode.

In box 406, the process 400 may control the switch devices in the charging system 110 to operate the charging system 110 in the fast charging operational mode consistent with FIG. 3.

In box 408, the process 400 may determine the need to operate in normal operational mode and/or receive a command to operate in the normal operational mode. The determination may be from the processor, the one or more sensors associated with the processor, the charging system 110, the battery system 102, the aircraft, the aircraft system, or the like.

In box 410, the process 400 may determine that operating in the normal operational mode is desired. If so, the process advances to box 412. Otherwise, the process 400 will loop until the normal operational mode is desired.

In box 412 the process 400 may operate switch devices in the charging system 110 to operate the charging system 110 in the normal operational mode consistent with FIG. 2.

Figure 5:
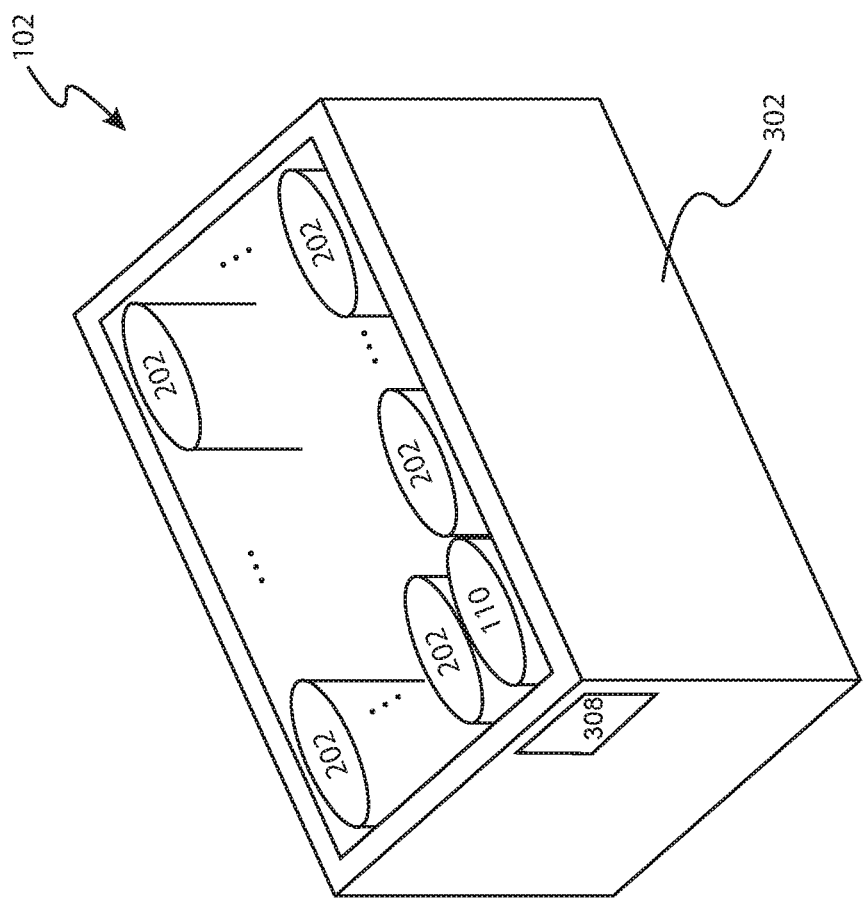
FIG. 5 illustrates a perspective view of an exemplary form factor and structural arrangement of the battery system and charger system for an aerospace application in accordance with aspects of the disclosure.

FIG. 5 illustrates a perspective view of an exemplary form factor and structural arrangement of the battery system and charger system for an aerospace application in accordance with aspects of the disclosure.

In particular, FIG. 5 illustrates a perspective view of the battery system 102 that includes a plurality of battery cells 202. The plurality of battery cells 202 may be arranged in a housing 302. In some implementations, the battery system 102 may include a dummy battery cell, which may be removed and the charging system 110 structured and arranged in place of the dummy battery cell as illustrated in FIG. 5.

The housing 302 may further include rigid walls and a floor to hold the battery cells 202 as well as the charging system 110. Various components within the housing 302 and the associated connections may be hermetically sealed. The housing 302 may further include various waterproofing technologies, insulation, cooling vents, and the like. The housing 302 may further include a cover (not shown) that fully encloses the housing 302. The housing 302 may further include a connector 308 that may be a plug or the like for electrical connection to the aircraft power bus 108, signal lines, control lines, or the like.

Figure 6:
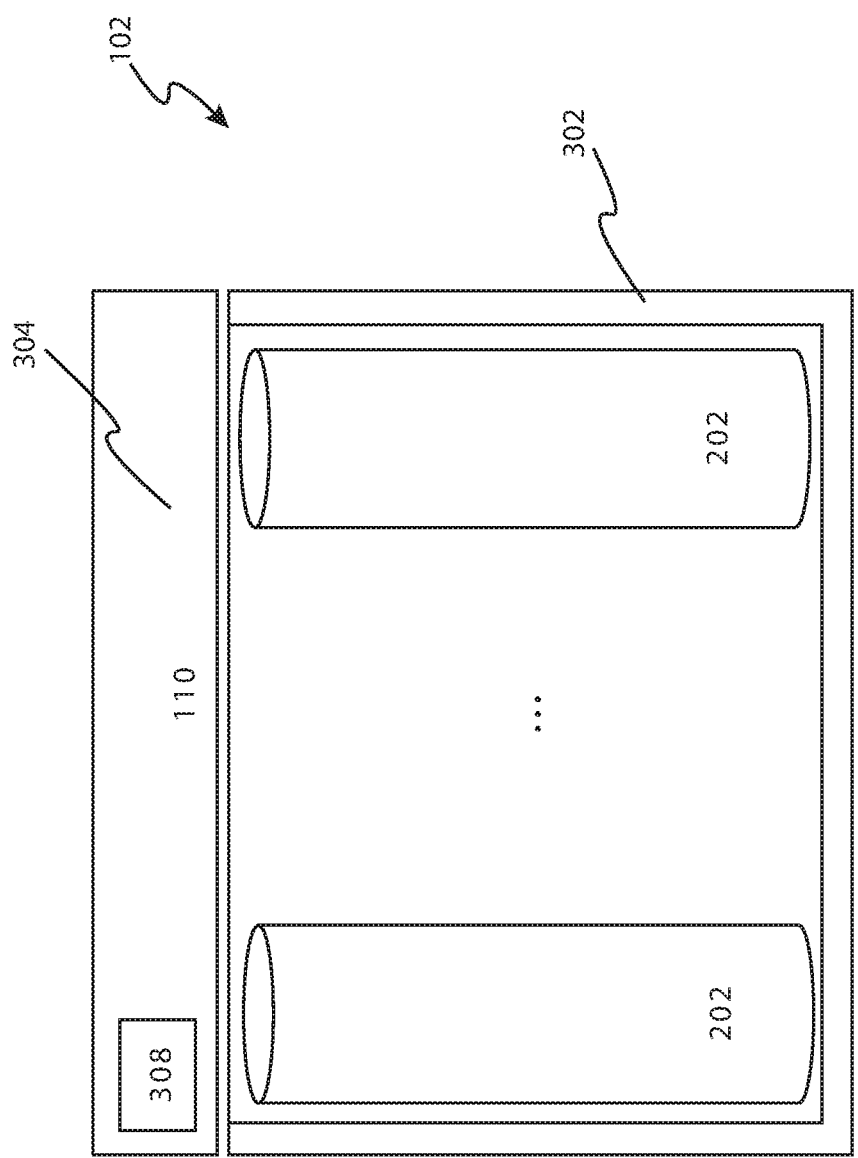
FIG. 6 illustrates a partial cross-sectional view of an exemplary form factor and structural arrangement of the battery system and charger system for an aerospace application in accordance with aspects of the disclosure.

FIG. 6 illustrates a partial cross-sectional view of an exemplary form factor and structural arrangement of the battery system and charger system for an aerospace application in accordance with aspects of the disclosure.

In particular, FIG. 6 illustrates a cross-sectional side view the battery system 102 that includes a plurality of battery cells 202. The plurality of battery cells 202 may be arranged in a housing 302. In some implementations, the battery system 102 may include a cover 304 and the charging system 110 may be structured and arranged in the cover 304 as illustrated in FIG. 6. The housing 302 may further include a connector 308 that may be a plug or the like for electrical connection to the aircraft power bus 108, signal lines, control lines, or the like.

Figure 7:
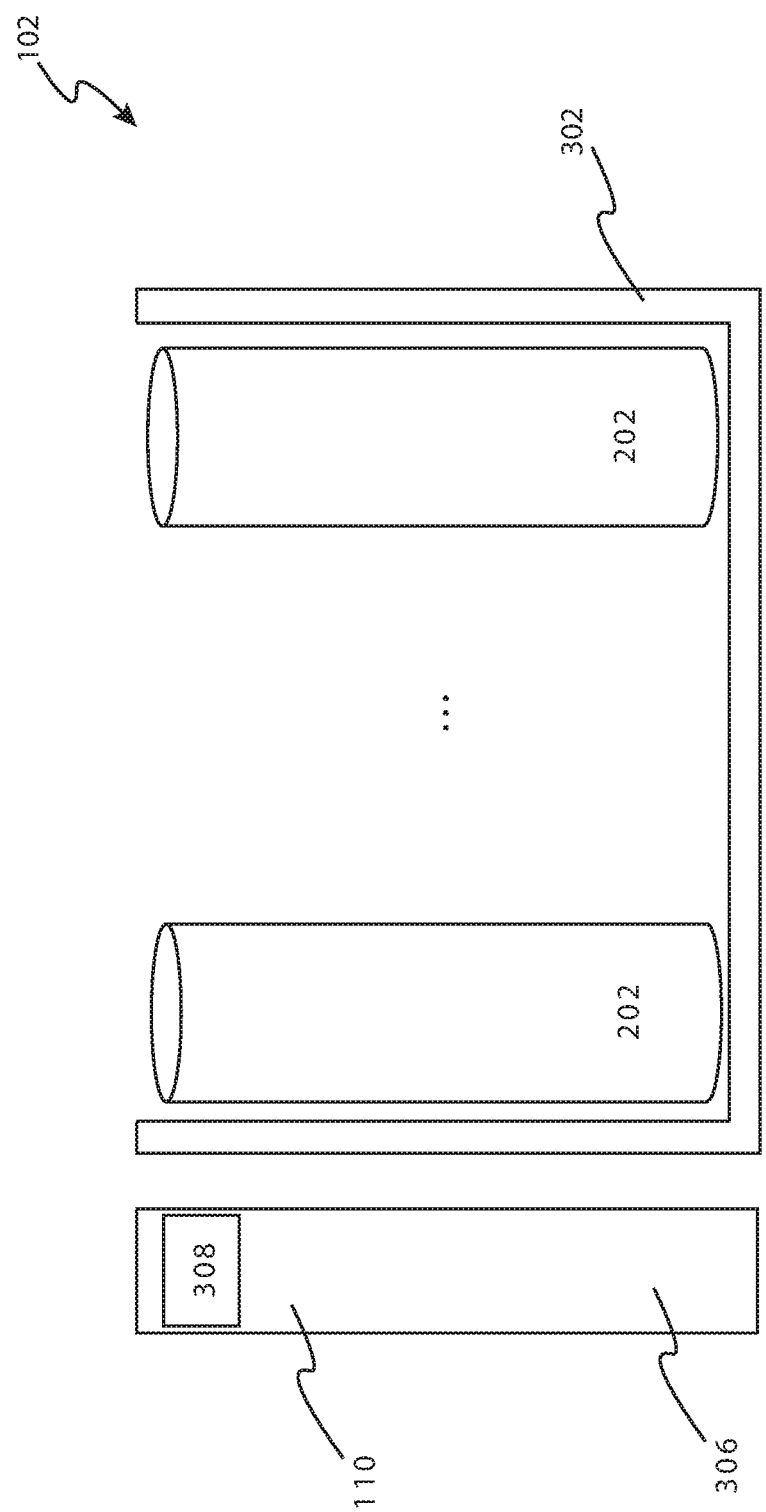
FIG. 7 illustrates a partial cross-sectional view of an exemplary form factor and structural arrangement of the battery system and charger system for an aerospace application in accordance with aspects of the disclosure.

FIG. 7 illustrates a partial cross-sectional view of an exemplary form factor and structural arrangement of the battery system and charger system for an aerospace application in accordance with aspects of the disclosure.

In particular, FIG. 7 illustrates a cross-sectional side view of the battery system 102 that includes a plurality of battery cells 202. The plurality of battery cells 202 may be arranged in a housing 302. In some implementations, the charging system 110 may be structured and arranged in a separate housing 306 as illustrated in FIG. 7.

The housing 306 may further include rigid walls and a floor to hold the charging system 110. Various components within the housing 306 and the associated connections may be hermetically sealed. The housing 306 may further include various waterproofing technologies, insulation, cooling vents, and the like. The housing 306 may further include a cover that fully encloses the housing 306.

Figure 8:
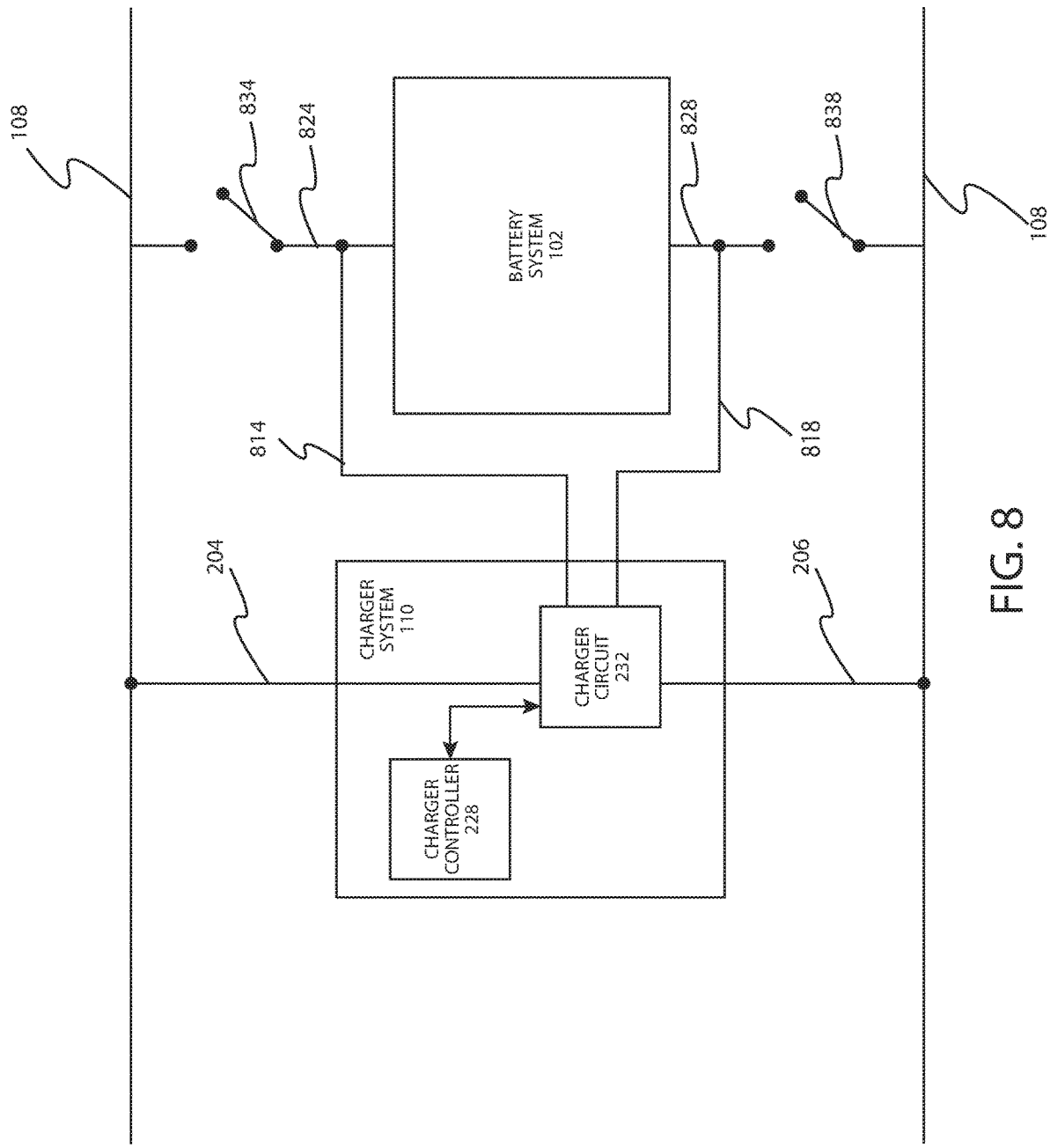
FIG. 8 illustrates another aspect of a battery system and charger system for an aerospace application in accordance with aspects of the disclosure.

FIG. 8 illustrates another aspect of a battery system and charger system for an aerospace application in accordance with aspects of the disclosure.

As illustrated in FIG. 8, in a further aspect, the charging system 110 may be configured to receive power from the aircraft power bus 108 and modify it according to a charging protocol. The power may then be delivered to the battery system 102 for charging the battery cells 202. In this regard, the charging system 110 may connect to the aircraft power bus 108 via first line 204 and a second line 206. In one aspect, the converted power is delivered through a line 814 to a line 824 as well as delivered to a line 818 and a line 828 for charging the battery system 102.

The charging system 110 may include a charger controller 228. The charger controller 228 may include a processor and may be implemented as a computer system that may include a memory, a display, a transceiver, a user interface, and the like. The processor may be configured to process functions, provide other services, and the like. The computer system may further include a user interface, an input/output device, a computer readable medium, and a power supply. Additionally, the computer system may implement an operating system, a touchscreen controller, a communications component, a graphics component, a contact/motion component, and the like to provide full functionality. In particular, the processor may be configured to execute a software application configured to control the charging system 110 to charge the battery system 102 with a desired charging protocol. In one aspect, the software application may be configured to interact with sensors, aircraft systems, and the like for a determination of a desired charging protocol.

The processor may further include one or more sensors to sense a condition of the battery system 102, the charging system 110, an aircraft system, a power source system 106, a powered aircraft system 104, ground-based power supply, or the like. In particular, the one or more sensors may provide signals to the processor in order to change the charging protocol. The one or more sensors may include a current sensor, a voltage sensor, temperature sensor, and the like.

The charger controller 228 may further control a charger circuit 232 implemented by the charging system 110. The charger circuit 232 may include one or more of a rectifier, DC to DC converter, transformer, voltage regulator, fuses, ground fault circuit interrupter, temperature sensing circuits, voltage sensing circuits, switching devices, and the like.

The charger circuit 232 may include a rectifier. The rectifier may be configured to convert alternating current (AC) to direct current (DC) as needed within the charging system 110.

The charger circuit 232 may include a DC to DC converter. The DC to DC converter converts a source of direct current (DC) from one voltage level to another as needed within the charging system 110.

The charger circuit 232 may include a transformer. The transformer may be configured to step up or step down the alternating current (AC) as needed within the charging system 110.

The charger circuit 232 may include a voltage regulator. The voltage regulator may be configured to provide a stable DC voltage independent of the load current, temperature, and AC power source variations as needed within the charging system 110.

The charger circuit 232 may include one or more fuses. The one or more fuses may be configured to protect against excessive current as needed within the charging system 110.

The charger circuit 232 may include a ground fault circuit interrupter (GFCI). The ground fault circuit interrupter (GFCI) may be configured to break an electric circuit to prevent serious harm from an ongoing electric shock as needed within the charging system 110.

The charging system 110 may implement a charging protocol. The charging protocol may determine particular voltage levels, current amounts, time periods, and the like for the delivery of power to the battery system 102. The charging protocol may include high voltage delivery. In one aspect, high voltage is a voltage higher than a voltage of the aircraft power bus 108.

The charging system 110 may be configured to utilize outputs from the temperature or voltage sensing circuits monitored by the charger controller 228 to safely adjust the charging current and voltage, determine the state of charge, and determined an end of charge.

The charging system 110 may be further configured to implement a trickle charger protocol. The trickle charger protocol may provide a relatively small amount of current, only enough to counteract self-discharge of a battery that is idle for a long time.

The charging system 110 may also implement active monitoring of the battery to protect it from overcharging.

In one aspect, the charging system 110 may include a charging protocol to supply a constant DC or pulsed DC power source to the battery system 102.

In one aspect, the charging system 110 may include a fast charging protocol controlled by the charger controller 228 to rapidly charge the battery system 102 without damaging any of the battery cells 202 in the battery system 102. The charging system 110 may include a cooling fan to reduce the temperature of the battery cells 202 to safe levels.

The charger controller 228 may implement a charging protocol to accelerate the charging time and provide continuous charging that may detect the state of the battery cells 202 and may apply a multi-stage charging scheme. The first stage may be a "bulk absorption" stage and the charging current may be held high and constant. A second stage may include a stage where the voltage is held constant. As the current declines at the maintained voltage, the charger controller 228 may implement a third stage and the charger output is held at a constant voltage.

The charger controller 228 may be configured to implement a charging protocol utilizing pulse technology in which a series of voltage or current pulses is fed to the battery cells 202. The DC pulses may have a strictly controlled rise time, pulse width, pulse repetition rate (frequency), and amplitude.

The charger controller 228 may be configured to implement a protocol with programmed complex charging cycles specified by the battery type.

The charger controller 228 may be configured to implement various safety protections. The safety protections implemented by the charger controller 228 may include over voltage protection, over charge protections, over current protections, over heat protections, short-circuit protections, over discharge protections, and like.

Before or during charging of the battery system 102, the battery system 102 may be disconnected or isolated from the aircraft power bus 108 by opening a switch 834 and/or a switch 838. The switch 834 and the switch 838 may be implemented using any known switching technology. In one aspect, the switch 834 and the switch 838 may be a relay. In one aspect, the relay may include a coil of wire wrapped around a soft iron core (a solenoid), an iron yoke, which provides a low reluctance path for magnetic flux, a movable iron armature, and one or more sets of contacts. Other configurations of the relay are contemplated as well. The relay may be implemented as a coaxial relay, contactor, force guided contacts relay, latching relay, machine tool relay, or the like. In one aspect, the switch may be solid-state relays. In one aspect, the switch may be a power module. The solid-state relays may use power semiconductor devices such as thyristors, transistors, or the like to switch currents. The transistors may include any type of transistor technology including a Bipolar junction transistor (BJT), a Field-effect transistor (FET), a junction gate field-effect transistor (JFET), a metal-oxide-semiconductor field-effect transistor (MOSFET), or the like.

The switch 834 and the switch 838 may be controlled manually, automatically, or the like. In one aspect, the control of switch 834 and the switch 838 may be in response to an aircraft system. The aircraft system may be a central maintenance system (CMS), a flight management system, a flight warning system, a cabin management system, or the like.

The aircraft system may be configured to ascertain a need for operating the charging system 110 in a normal operational mode or the fast charging operational mode and control the charging system 110 and/or switch 834 and the switch 838 to operate in the desired mode.

In one aspect, the control of switch 834 and the switch 838 may be in response to a processor. The processor may be configured to ascertain a need for operating the charging system 110 in the normal operational mode or the fast charging operational mode and control the charging system 110 and/or switch 834 and the switch 838 to operate in the desired mode. The processor may be implemented in the charging system 110, the processor may be implemented in the aircraft, an aircraft system, or the like.

The charging system 110 and/or the processor may include Built-in test equipment (BITE) as described above.

In a particular aspect, the Battery/Charger Assembly will connect through standard plug. A normally closed contact will be placed in series between the top ten and the bottom ten cells. A normally opened contact will be placed in series with a resistor, at the bottom of the top ten cells. A normally opened contact will be placed in series with a resistor, at the top side of the bottom ten cells. During normal operation, the battery will behave as a normal battery does. When increased charging is required, a signal will be sent to the contactors that causes the battery to separate into two parts. The bus voltage will be applied across the top and bottom ten cells separately allowing increased current to the cells. The signal may be created from a time delay relay or signals available to the aircraft. The charging current during normal operation is defined by the CV charge of the battery in question. The charging current during increased current operation is defined by (Bus Voltage−(Battery Voltage/2))/Resistance.

Accordingly, the disclosure has set forth details of a charging system. The charging system taught by the disclosure has a decreased charging time. Moreover, numerous other beneficial features are set forth in the disclosure.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A battery charger system comprising:
a first circuit configured to connect to a first line of a power bus and a second set of battery cells;
a second circuit configured to connect to a second line of the power bus and a first set of battery cells;
the first circuit comprising a first switch to electrically connect or disconnect the first circuit to the first line of the power bus and the second set of battery cells;
the second circuit comprising a second switch to electrically connect or disconnect the second circuit to the second line of the power bus and the first set of battery cells;
a third circuit configured to connect the first set of battery cells to the second set of battery cells;
the third circuit comprising a third switch to electrically connect or disconnect the first set of battery cells to the second set of battery cells; and
a fast charging operational configuration comprising the third switch being opened, the first switch of the first circuit being closed, and the second switch of the second circuit being closed, the fast charging operational configuration being implemented in response to an aircraft system ascertaining a need for operating in the fast charging operational configuration,
wherein the third circuit is configured to operate the third switch to electrically disconnect the first set of battery cells from the second set of battery cells to implement the fast charging operational configuration;
wherein the first circuit is configured to close the first switch to electrically connect the first circuit to the first line of the power bus and the second set of battery cells to implement the fast charging operational configuration; and
wherein the second circuit is configured to close the second switch to electrically connect the second circuit to the first line and the second line of the power bus and the first set of battery cells to implement the fast charging operational configuration.

2. The battery charger system of claim 1,
wherein the first circuit connects to the first line of the power bus;
wherein the first circuit further comprises a resistor;
wherein the second circuit further comprises a resistor;
wherein the second circuit connects to the second line of the power bus;
wherein the fast charging operational configuration comprises the first circuit, the second circuit, and the third circuit being configured such that the first set of battery cells directly receive power from the power bus; and
wherein the fast charging operational configuration comprises the first circuit, the second circuit, and the third circuit being configured such that the second set of battery cells directly receive power from the power bus.

3. The battery charger system of claim 1, wherein the third circuit is configured to close the third switch to electrically connect the first set of battery cells to the second set of battery cells to provide power to the first line and the second line of the power bus.

4. The battery charger system of claim 1, wherein the third circuit is configured to close the third switch to electrically connect the first set of battery cells to the second set of battery cells to receive power from the first line and the second line of the power bus during a normal operational configuration;
wherein the first set of battery cells receive a larger voltage in the fast charging operational configuration with respect to the normal operational configuration; and
wherein the second set of battery cells receive a larger voltage in the fast charging operational configuration with respect to the normal operational configuration.

5. The battery charger system of claim 1, wherein the first switch, the second switch, and the third switch each comprise a relay.

6. The battery charger system of claim 1, wherein the first switch, the second switch, and the third switch are each configured to close or open in response to one or more control signals.

7. The battery charger system of claim 1,
wherein the first set of battery cells and the second set of battery cells are configured to provide power to at least one powered aircraft system;
wherein the third circuit is configured to close the third switch to electrically connect the first set of battery cells to the second set of battery cells to provide power to the second line of the power bus; and
wherein the third circuit is configured to close the third switch to electrically connect the first set of battery cells to the second set of battery cells to receive power from the first line of the power bus.

8. The battery charger system of claim 1,
wherein the power bus comprises an aircraft power bus;
wherein the third circuit is configured to close the third switch to electrically connect the first set of battery cells to the second set of battery cells to provide power to the second line of the power bus; and
wherein the third circuit is configured to close the third switch to electrically connect the first set of battery cells to the second set of battery cells to receive power from the first line of the power bus.

9. An aircraft power system comprising the battery charger system of claim 1 and further comprising a battery system comprising the first set of battery cells and the second set of battery cells;
wherein the third circuit is configured to close the third switch to electrically connect the first set of battery cells to the second set of battery cells to provide power to the second line of the power bus; and
wherein the third circuit is configured to close the third switch to electrically connect the first set of battery cells to the second set of battery cells to receive power from the first line of the power bus.

10. A battery charger process comprising:
connecting a first circuit to a first line of a power bus and a second set of battery cells;
connecting a second circuit to a second line of the power bus and a first set of battery cells;

configuring the first circuit with a first switch to electrically connect or disconnect the first circuit to the first line of the power bus and the second set of battery cells;
configuring the second circuit with a second switch to electrically connect or disconnect the second circuit to the second line of the power bus and the first set of battery cells;
configuring a third circuit to connect the first set of battery cells to the second set of battery cells; and
operating a fast charging operational configuration comprising a third switch being opened, the first switch of the first circuit being closed, and the second switch of the second circuit being closed in response to an aircraft system ascertaining a need for operating in the fast charging operational configuration,
wherein the third circuit comprises the third switch to electrically connect or disconnect the first set of battery cells to the second set of battery cells;
wherein the third circuit is configured to operate the third switch to electrically disconnect the first set of battery cells from the second set of battery cells to implement the fast charging operational configuration;
wherein the first circuit is configured to close the first switch to electrically connect the first circuit to the first line of the power bus and the second set of battery cells to implement the fast charging operational configuration; and
wherein the second circuit is configured to close the second switch to electrically connect the second circuit to the first line and the second line of the power bus and the first set of battery cells to implement the fast charging operational configuration.

11. The battery charger process of claim 10,
wherein the first circuit connects to the first line of the power bus;
wherein the first circuit further comprises a resistor;
wherein the second circuit further comprises a resistor;
wherein the second circuit connects to the second line of the power bus;
wherein the fast charging operational configuration comprises the first circuit, the second circuit, and the third circuit being configured such that the first set of battery cells directly receive power from the power bus; and
wherein the fast charging operational configuration comprises the first circuit, the second circuit, and the third circuit being configured such that the second set of battery cells directly receive power from the power bus.

12. The battery charger process of claim 10, wherein the third circuit is configured to close the third switch to electrically connect the first set of battery cells to the second set of battery cells to provide power to the first line and the second line of the power bus.

13. The battery charger process of claim 10,
wherein the third circuit is configured to close the third switch to electrically connect the first set of battery cells to the second set of battery cells to receive power from the first line and the second line of the power bus during a normal operational configuration;
wherein the first set of battery cells receive a larger voltage in the fast charging operational configuration with respect to the normal operational configuration; and
wherein the second set of battery cells receive a larger voltage in the fast charging operational configuration with respect to the normal operational configuration.

14. The battery charger process of claim 10,
wherein the first switch, the second switch, and the third switch each comprise a relay;
wherein the third circuit is configured to close the third switch to electrically connect the first set of battery cells to the second set of battery cells to provide power to the second line of the power bus; and
wherein the third circuit is configured to close the third switch to electrically connect the first set of battery cells to the second set of battery cells to receive power from the first line of the power bus.

15. The battery charger process of claim 10,
wherein the first switch, the second switch, and the third switch are each configured to close or open in response to one or more control signals;
wherein the third circuit is configured to close the third switch to electrically connect the first set of battery cells to the second set of battery cells to provide power to the second line of the power bus; and
wherein the third circuit is configured to close the third switch to electrically connect the first set of battery cells to the second set of battery cells to receive power from the first line of the power bus.

16. The battery charger process of claim 10,
wherein the first set of battery cells and the second set of battery cells are configured to provide power to at least one powered aircraft system;
wherein the third circuit is configured to close the third switch to electrically connect the first set of battery cells to the second set of battery cells to provide power to the second line of the power bus; and
wherein the third circuit is configured to close the third switch to electrically connect the first set of battery cells to the second set of battery cells to receive power from the first line of the power bus.

17. The battery charger process of claim 10,
wherein the power bus comprises an aircraft power bus;
wherein the third circuit is configured to close the third switch to electrically connect the first set of battery cells to the second set of battery cells to provide power to the second line of the power bus; and
wherein the third circuit is configured to close the third switch to electrically connect the first set of battery cells to the second set of battery cells to receive power from the first line of the power bus.

18. The battery charger process of claim 10 further comprising:
configuring an aircraft power system with a battery comprising the first set of battery cells and the second set of battery cells;
wherein the third circuit is configured to close the third switch to electrically connect the first set of battery cells to the second set of battery cells to provide power to the second line of the power bus; and
wherein the third circuit is configured to close the third switch to electrically connect the first set of battery cells to the second set of battery cells to receive power from the first line of the power bus.

19. An aircraft-based power system comprising:
a charger system that comprises a charger controller and a charger circuit;
the charger system further configured to connect to an aircraft power bus;
the charger system further configured to deliver power from the aircraft power bus to the charger circuit;
the charger circuit configured to be controlled by the charger controller;

the charger controller configured to control the charger circuit consistent with a charging protocol in response to an aircraft system ascertaining a need for operating in the charging protocol;

the charger circuit configured to generate a voltage higher than a voltage of the aircraft power bus;

the charger system further configured to charge a battery system comprising a plurality of battery cells with the charger circuit consistent with the charging protocol that comprises the voltage higher than the voltage of the aircraft power bus; and at least one switch arranged on a circuit between the battery system and an aircraft bus, wherein the at least one switch is configured to isolate the battery system from the aircraft bus while the charger system charges the battery system.

20. The aircraft-based power system of claim 19, further comprising:

one or more sensors to sense a condition of the battery system;

the one or more sensors are configured to provide signals to the charger controller;

the one or more sensors comprise at least one of the following: a current sensor, a voltage sensor, and temperature sensor; and a battery housing configured to store the battery system, wherein the charger system is arranged in the battery housing.

21. The aircraft-based power system of claim 19, further comprising:

a battery housing configured to store the battery system; and a battery housing cover configured to cover the battery housing, wherein the charger system is arranged in the battery housing cover.

22. The aircraft-based power system of claim 19, further comprising:

a battery housing configured to store the battery system; and a charger system housing configured to store the charger system, wherein the charger system housing is arranged adjacent to the battery housing; and wherein the charger circuit comprises at least one of the following: a rectifier, DC to DC converter, transformer, and voltage regulator.

23. The aircraft-based power system of claim 19, wherein:

the charger circuit comprises at least one of the following: a rectifier, DC to DC converter, transformer, voltage regulator, fuses, ground fault circuit interrupter, temperature sensing circuits, voltage sensing circuits, and switching devices; and the battery system is configured to be connected to an aircraft power bus.

24. The aircraft-based power system of claim 19, wherein the charger circuit comprises at least one of the following: a rectifier, DC to DC converter, transformer, and voltage regulator;

wherein the charging protocol comprises a plurality of charging protocols; and wherein the plurality of charging protocols comprise at least a fast charging protocol and a trickle charge charging protocol.

\* \* \* \* \*